Figure 1:
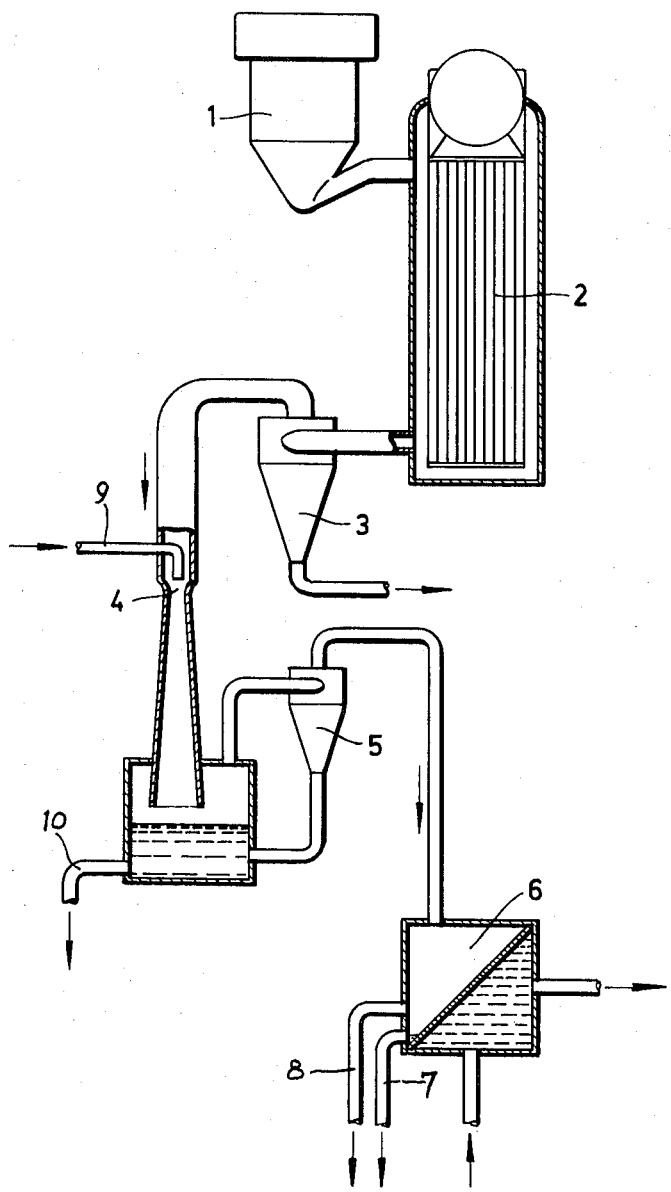

United States Patent Office 3,250,591
Patented May 10, 1966

3,250,591
METHOD OF RECOVERING VALUES FROM THE PYROLYSIS OF SPENT SODIUM SULFITE LIQUOR
Carl Arne Bergholm, Sundsvall, and Göran Stahre, Essvik, Sweden, assignors to Billeruds Aktiebolag, Saffle, Sweden, and Svenska Cellulosa Aktiebolaget, Sundsvall, Sweden, a company of Sweden
Filed July 1, 1963, Ser. No. 291,762
Claims priority, application Sweden, July 6, 1962, 7,636/62
4 Claims. (Cl. 23—48)

This invention relates to the purification of a gas which contains hydrogen sulphide and which has been produced in the pyrolysis of spent cellulose liquors resulting from the cooking of plant materials by the sulphite or sulphate processes. It is the object of the invention to purify a pyrolysis gas which contains, among other constituents, hydrogen, carbon monoxide, water vapour and hydrogen sulphide, so as to recover the accompanying particles of sodium carbonate by a washing process, while avoiding absorption of any essential quantity of hydrogen sulphide in the sodium carbonate solution thus formed, thus producing a solution of sodium carbonate which is useful for the preparation of fresh sodium sulphite cooking liquor.

It is known from, for instance, Canadian Patent No. 552,789 and U.S. Patent No. 2,889,874 that the sodium content of spent sodium sulphite liquors can be transformed into soda by spraying the spent liquor into a tube-shaped reactor having its walls heated to 600–800° C. While passing through the reactor the water evaporates from the liquor, whereafter the organic substance is gasified, at least partially, producing CO, $CO_2$, $H_2$ and $H_2S$. In this reducing atmosphere the entire content of sulphur in the spent liquor is transformed into $H_2S$, while the sodium content is transformed into $Na_2CO_3$ having a low content of $Na_2SO_4$ and practically free from $Na_2S$. Consequently the spent liquor decomposes to form a gas containing practically the whole sulphur content, and solid particles containing the whole sodium content and usually free carbon. These solid particles consisting essentially of sodium carbonate can be used for the production of fresh cooking liquor after they have been separated from the free carbon by a leaching process, for instance.

Our co-pending Swedish patent applications Nos. 2947/60, 12464/60, 12724/60 and 1949/62 disclose methods for pyrolyzing spent sodium liquors. It is a common feature of said methods that the spent liquor is finely divided by being sprayed into a hot chamber where it is pyrolyzed in a reducing atmosphere. The heat required for evaporating the water and maintaining the pyrolyzing temperature is produced by the supply of a hot combustion gas, which may contain free oxygen. All these methods produce a solid residue in the form of fine particles which contain free carbon and which contain the alkali metal substantially as carbonate, and a gas containing the sulphur as hydrogen sulphide.

Part of the solid residue produced in said methods can be separated from the gas in dynamic separators, for instance cyclone-separators. Part of the solid residue, however, is extremely finely divided, and a satisfactory separation can be obtained only by the use of electro-filters or a plurality of cyclone-separators of small diameter. A complete separation, however, is hardly obtained.

Efforts have been made to separate the solid particles in a wet separator, for instance a venturi scrubber. This method is usual in the recovery of MgO resulting from sulphite cooking processes based upon Mg-liquors, and is sometimes used for recovering chemicals in the sulphate cooking process. There are, however, two difficulties which prevent the use of a scrubber for the present purpose. The hydrogen sulphide in the gas reacts with the washing liquor, which is alkaline due to the presence of carbonates, for instance soda. The washing process results in a cold gas which is hardly combustible without being heated.

This invention removes said difficulties. According to the invention the pyrolysis gas, which contains solid particles, and which has been cooled, if desired, is washed with a solution containing sodium bicarbonate, at such a temperature that there is no essential condensation of the water vapour in the gas. The washed gas, containing no solid particles, preferably is cooled in a subsequent operation so that the major portion of the water vapour is condensed. If said condensation were to take place in the washing solution this solution would be diluted, thus being less useful for use in the cooking process. The presence of bicarbonate in the washing liquor prevents the formation of sulphide, which would make it impossible to use the solution for preparing fresh sulphite cooking liquor.

Figure 2:
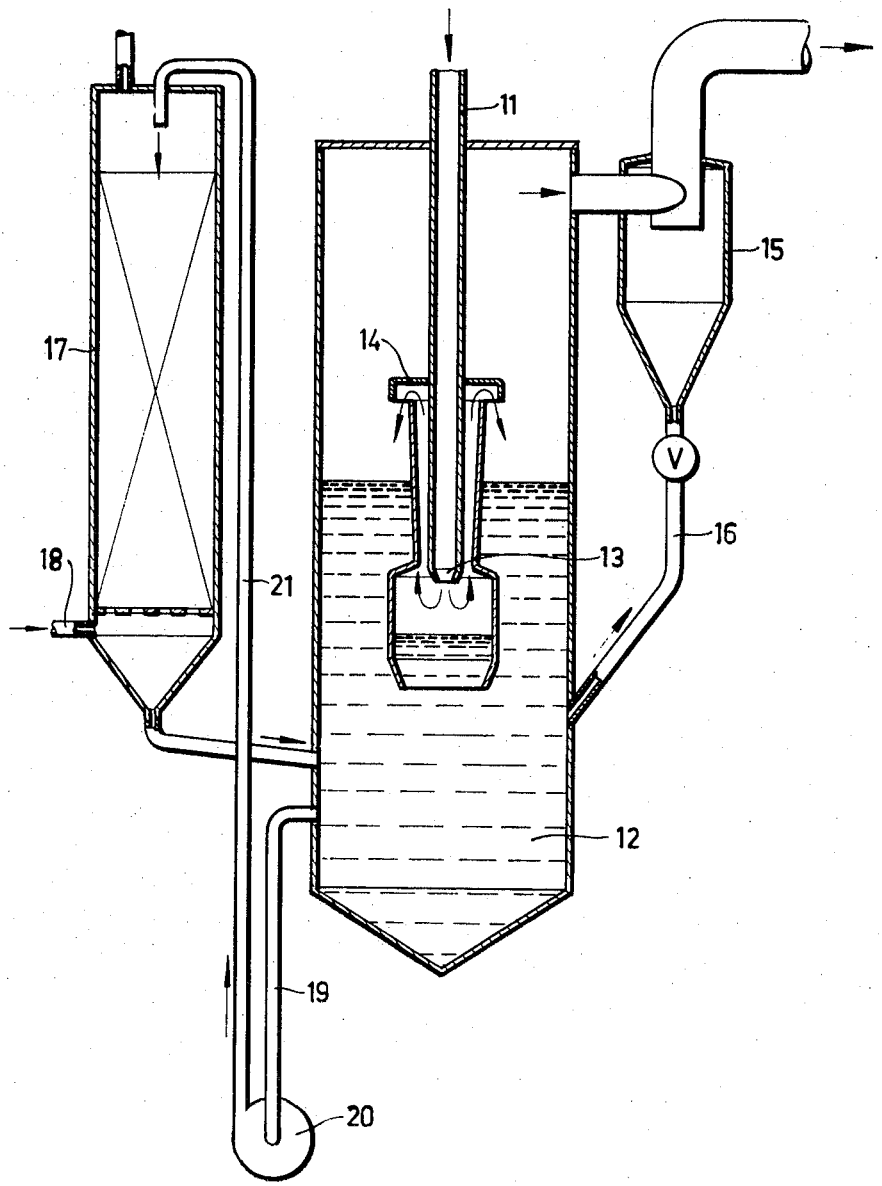

The invention will now be described in connection with the accompanying drawings in which:
FIG. 1 illustrates an apparatus for carrying out the invention, and
FIG. 2 illustrates a scrubber.

Referring to FIG. 1 a hot pyrolysis gas from a pyrolysis reactor 1 is cooled in a waste heat boiler 2, to a temperature below 300° C., for instance to a temperature of 200° C. Part of the solid particles contained in the gas are separated from the gas in a cyclone separator 3. This cyclone separator may be dispensed with, but it is useful if it is desired to produce a sodium carbonate solution having a high concentration. The cooled gas, containing the residual part of the solid particles, is passed through a venturi scrubber 4–5, containing a solution of sodium bicarbonate as washing liquid. The washing liquid is supplied through pipe 9 and is withdrawn through pipe 10. The washing liquid is supplied to the scrubber in the desired quantity and having a temperature so chosen that there is no essential condensation of the water vapour in the gas. The solid particles are absorbed by the liquid drops in the venturi portion 4, and the drops are separated from the gas in the cyclone separator 5. The intense contact between gas and liquid results in a considerable quantity of $CO_2$ dissolving in the liquid. Only an insignificant quantity of $H_2S$ dissolves, provided that the washing liquor, when supplied, contains a sufficient amount of bicarbonate. The gas leaving the scrubber is passed to a cooler 6. Here the main portion of the water vapour is condensed, and the condensate is withdrawn through pipe 7. Part of the hydrogen sulphide dissolves in the liquid, but said dissolved quantity is very small as the condensed water is acid, owing to the fact that the alkaline particles have been separated in the venturi scrubber. If indirect cooling is used, as illustrated, the only material which takes away hydrogen sulphide from the gas is the condensate, which removes less than one thousandth of the hydrogen sulphide content of the gas. In spite of this small amount of hydrogen sulphide the condensate can cause sanitary inconveniences. These inconveniences are more pronounced if direct cooling is used, as the quantity of water is greater, and said greater quantity of water, consequently, removes a greater part of the hydrogen sulphide from the gas. A remedy for these sanitary inconveniences is to supply a small amount of an oxidizing agent to the water.

The gas leaving the cooler 6 through pipe 8 contains no solid particles, and its content of combustible constituents is comparatively high, owing to its original content of water vapour having been removed by condensation. The gas contains at least 99% of its original content of sulphur. The gas can be combusted, without being preheated, so as to produce steam, for instance.

In experiments with a sodium-based spent sulphite liquor it was found, in order to produce a washing liquid which was entirely free from sulphide, that it was necessary to supply a washing liquid containing about 100 grams sodium bicarbonate per liter, if the content of $Na_2CO_3$ in the gas was about 5 grams per cubic meter (at normal pressure and temperature). In these experiments the gas was subjected to a preliminary purification in a cyclone separator. The quantity of washing liquid was about 0.1 liter per cubic meter gas (at normal pressure and temperature), which means that the quantity of bicarbonate as supplied was approximately 2 grams per gram carbonate in the gas. The solution leaving the scrubber contains mainly sodium bicarbonate, and therefore it can be recirculated to the scrubber to be used as fresh washing liquor. It is useful, however, to add a small quantity of $CO_2$ to said solution before it is re-entered into the scrubber. The major quantity of the $CO_2$ required for transforming the carbonate into bicarbonate is absorbed by the washing liquid from the pyrolysis gas, which contains in normal cases about 10% $CO_2$.

FIG. 2 illustrates another embodiment of the scrubber. The gas is supplied through conduit 11 and impinges against the surface of the washing liquid, thus producing a mixture of gas and liquid. Said mixture passed upward through the venturi tube 13 and impinges against a plate 14 where the major quantity of the liquid is separated from the gas. The remaining liquid drops in the gas are separated from the gas in the cyclone separator 15, and the liquid is passed back to tank 12 through pipe 16. The apparatus described so far belongs to the known art. The novelty resides in the means for supplying $CO_2$ to the washing liquid, said means being represented by the column 17. Liquid is pumped from tank 12 through pipe 19, pump 20 and pipe 21 to the top of column 17. While passing down the column the liquid comes into a counter-current contact with a gas which contains $CO_2$. The gas is supplied to the column through pipe 18. The gas preferably is pure $CO_2$, but it can be the pyrolysis gas after the solid particles have been removed in the scrubber, or a combustion gas. Pure $CO_2$ can be produced in several ways, for instance in a recovery plant for the sulphite process or from stripping the bicarbonate solution produced in the scrubber, but this last mentioned method requires heat. The liquid is passed back to tank 12 from the bottom of column 17, part of its carbonate content having now been transformed into bicarbonate.

The use of an auxiliary cyclone separator for separating coarse soda particles from the gas results in a lower bicarbonate consumption in the scrubber, and consequently also results in a lower $CO_2$-consumption in column 17. The use of an auxiliary cyclone separator also results in that a higher sulphide content can be tolerated in the liquid in the scrubber. In a soda which is to be used for the production of fresh cooking liquor the highest allowable amount of sulphide is about 3 grams $Na_2S$ per 100 grams $Na_2CO_3$, but usually a much lower content is desired, for instance 0.5 grams per 100 grams soda. If 80% of the total quantity of soda in the gas is separated from the gas in the cyclone separator, the solution leaving the scrubber can be permitted to contain 2.5 grams $Na_2S$ per 100 grams $Na_2CO_3$. This results in a total quantity of sulphide of 0.5 gram per 100 grams $Na_2CO_3$, if the quantity of soda as separated in the cyclone separator is also taken in consideration.

EXAMPLE 1

A gas produced in the pyrolysis of spent sodium sulphite liquor contained ashes in the form of fine particles consisting of soda and free carbon. The main portion of the ashes was separated from the gas in a cyclone separator, and the gas was cooled to about 250° C. The ashes thus separated consisted of 50% carbon and 50% sodium carbonate and traces of sodium sulphate. The gas leaving the cyclone separator contained 10 grams ashes per cubic meter (at normal pressure and temperature). This gas was passed through a venturi scrubber in a quantity of 60 cubic meters (at normal pressure and temperature) per hour. The velocity in the most narrow portion of the scrubber was 90 meters per second. Water was added just before said narrowest portion in a quantity of 8 liters per hour. The experiment was continued for 40 minutes. The main portion of the ashes was absorbed by the washing water. Washing solution was withdrawn from the scrubber in a quantity of 3 liters. The remaining quantity of washing water had evaporated owing to the high temperature of the gas. The solution as withdrawn contained 10.4 grams $Na_2S$ per 100 grams $Na_2CO_3$. The pH-value of the washing solution was 9.4.

EXAMPLE 2

A solution containing 114 grams $NaHCO_3$ per liter was supplied as washing liquid to the scrubber used in Example 1. The pH-value of the solution was about 9. The experiment was continued for 30 minutes, and 1.7 liters washing liquid was supplied during that time. Gas was supplied in a quantity of 50 cubic meters (at normal pressure and temperature) per hour. The washing solution amounted to 1.2 liters. It contained 0.27 grams $Na_2S$ per 100 grams $Na_2CO_3$, and had a pH-value of 8.9.

EXAMPLE 3

A solution containing 54 grams $NaHCO_3$ per liter and having a pH-value of 8.1 was supplied to the scrubber used in Examples 1 and 2. The experiment was continued for 20 minutes. The gas supply amounted to 78 cubic meters (at normal pressure and temperature) per hour. The quantity of washing liquid as supplied was 1.85 liters. The quantity remaining after the experiment was 0.97 liter, containing 7.7 grams $Na_2S$ per 100 grams $Na_2CO_3$ and having a pH-value of 9.1.

EXAMPLE 4

An aqueous solution of $CO_2$ having a pH-value of 5.1 was supplied as washing liquid to the scrubber used in Examples 1–3 in a total quantity of 2.2 liters. The experiment was continued for 18 minutes. The gas supply was 81 cubic meters (at normal pressure and temperature) per hour. The quantity of washing solution remaining after the experiment was 1.25 liters, containing 22.5 grams $Na_2S$ per 100 grams $Na_2CO_3$, and having a pH-value of 9.2.

What we claim is:

1. A method for treating a gas which contains hydrogen sulphide and solid particles of sodium carbonate so as to recover the sodium carbonate in a substantially sulphur-free form, which comprises subjecting the gas to a wet purification process with a washing liquid consisting of an aqueous solution of sodium bicarbonate.

2. A method as claimed in claim 1, which comprises withdrawing a quantity of washing liquid from the wet purification process, supplying carbon dioxide to said withdrawn quantity of washing liquid, and again supplying said quantity of washing liquid to the wet purification process.

3. A method as claimed in claim 1 for treating a gas produced in the pyrolysis of a spent sodium sulphite cooking liquor, which comprises cooling the gas to a temperature below 300° C. before subjecting it to the wet purification process.

4. A method for recovering soda and sulphur dioxide from a spent sodium sulphite cooking liquor, comprising pyrolyzing the liquor so as to produce a hot gas containing hydrogen sulphide and fine soda particles, cooling said gas to a temperature below 300° C., subjecting the gas at said temperature to a dry cyclone separating process so as to separate the major portion of the soda particles from the gas, subjecting the gas to a wet purification process with an aqueous solution containing at least 100 grams sodium bicarbonate per liter at a temperature at which there is no substantial condensation of water vapor, bringing the gas in contact with a cold surface so as to remove the major portion of the water vapour by condensation, and combusting said cold dry gas so as to transform its content of hydrogen sulphide into sulphur dioxide.

References Cited by the Examiner

UNITED STATES PATENTS

| | | | |
|---|---|---|---|
| 2,536,603 | 1/1951 | Holmboe | 23—285 |
| 2,993,753 | 7/1961 | Collins | 23—48 |
| 3,073,672 | 1/1963 | Cederquist | 23—48 |
| 3,172,736 | 3/1965 | Gee et al. | 23—285 |

OSCAR R. VERTIZ, *Primary Examiner.*

BENJAMIN HENKIN, *Examiner.*

G. OZAKI, *Assistant Examiner.*